United States Patent
Oka

(10) Patent No.: US 12,021,562 B2
(45) Date of Patent: Jun. 25, 2024

(54) TAP COUPLER, OPTICAL COMMUNICATION APPARATUS, AND OPTICAL BRANCHING METHOD

(71) Applicant: Fujitsu Optical Components Limited, Kawasaki (JP)

(72) Inventor: Akira Oka, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/839,549

(22) Filed: Jun. 14, 2022

(65) Prior Publication Data

US 2023/0058705 A1    Feb. 23, 2023

(30) Foreign Application Priority Data

Aug. 20, 2021    (JP) .................. 2021-134948

(51) Int. Cl.
*H04B 10/40*    (2013.01)
*G02B 6/28*    (2006.01)
*H04B 10/25*    (2013.01)

(52) U.S. Cl.
CPC .......... *H04B 10/40* (2013.01); *G02B 6/2852* (2013.01); *H04B 10/25891* (2020.05)

(58) Field of Classification Search
CPC . H04B 10/40; H04B 10/25891; G02B 6/2852
USPC ........................................................ 398/24
See application file for complete search history.

(56) References Cited

U.S. PATENT DOCUMENTS

| 10,935,726 | B1* | 3/2021 | Lee ................... G02F 1/3136 |
| 2015/0086157 | A1* | 3/2015 | Fontaine ............... H04J 14/04 385/28 |
| 2021/0239905 | A1* | 8/2021 | Baba .................. G02B 6/1228 |
| 2021/0325607 | A1* | 10/2021 | Oka .................... G02B 6/14 |

FOREIGN PATENT DOCUMENTS

WO    WO 2015/133344 A1    9/2015
WO    WO-2015133344 A1 *    9/2015 ............. G02B 6/126

OTHER PUBLICATIONS

Hirohito Yamada et al., "Optical Directional Coupler Based on Si-Wire Waveguides" IEEE Photonics Technology Letters, vol. 17, No. 3, Mar. 2005; pp. 585-587; (3 pages).

* cited by examiner

*Primary Examiner* — Dalzid E Singh
(74) *Attorney, Agent, or Firm* — STAAS & HALSEY LLP

(57) ABSTRACT

A tap coupler includes a mode generation unit, a separation unit, and an output unit. The mode generation unit generates, in accordance with a discontinuous portion disposed on a travelling path of signal light that is propagating, a first mode of the signal light and a second mode that is different from the first mode. The separation unit separates, when the first mode and the second mode are input from the mode generation unit, the first mode and the second mode. The output unit outputs branch light in accordance with a transition of the second mode received from the separation unit.

11 Claims, 15 Drawing Sheets

TAP COUPLER, OPTICAL COMMUNICATION APPARATUS, AND OPTICAL BRANCHING METHOD

CROSS-REFERENCE TO RELATED APPLICATION

This application is based upon and claims the benefit of priority of the prior Japanese Patent Application No. 2021-134948, filed on Aug. 20, 2021, the entire contents of which are incorporated herein by reference.

FIELD

The embodiments discussed herein are related to a tap coupler, an optical communication apparatus, and an optical branching method.

BACKGROUND

In recent years, an optical device using an optical waveguide element with a substrate type capable of implementing a small-size optical communication apparatus is actively developed. The optical waveguide element with the substrate type propagates an optical signal by using an optical waveguide that has a core formed on the substrate and a clad that covers the core, and implements an optical device that has various functions.

As the optical device, to control signal light that is used to perform transmission and reception, there is a system that monitors a part of the signal light and that controls the signal light on the basis of the monitoring result. FIG. 19 is a diagram illustrating an example of using a tap coupler 110. A system 100 illustrated in FIG. 19 includes the tap coupler 110, a monitor photo detector (PD) 120, a controller 130, and a variable attenuator 140. The variable attenuator 140 is an optical amplifier that adjusts the level of the signal light. The tap coupler 110 includes an input port 110A, an eleventh output port 110B, and a twelfth output port 110C. The input port 110A is a port that is optically coupled to the variable attenuator 140 that inputs the signal light received from the variable attenuator 140. The eleventh output port 110B is a port that outputs the signal light. The twelfth output port 110C is a port that is optically coupled to the monitor PD 120 and that outputs, as monitor light, a portion of the signal light that has been optically branched. The tap coupler 110 optically branches the signal light that has been input from the input port 110A, outputs a portion of the signal light from the twelfth output port 110C, and outputs the remaining signal light from the eleventh output port 110B.

The monitor PD 120 converts the monitor light that is a portion of the signal light that has been input from the tap coupler 110 to a current value and detects the converted current value. Then, the controller 130 controls, on the basis of the current value detected by the monitor PD 120, the variable attenuator 140 that is disposed in, for example, the input stage of the tap coupler 110 and adjusts the level of the signal light.

FIG. 20 is a plan view illustrating an example of a core portion of the tap coupler 110, and FIG. 21 is a cross-sectional view taken along line C-C of the tap coupler 110 illustrated in FIG. 20. The tap coupler 110 includes a core 114 and a clad 113 that covers the core 114. The core 114 is an optical waveguide having a channel waveguide structure. The clad 113 includes an upper side clad 113A and a lower side clad 113B.

The core portion of the tap coupler 110 includes an eleventh optical waveguide 111 and a twelfth optical waveguide 112 that is disposed in parallel with the eleventh optical waveguide 111. The eleventh optical waveguide 111 outputs the signal light that has been input from the input port 110A to the eleventh output port 110B. The twelfth optical waveguide 112 obtains, as the monitor light, a portion of the signal light in an adjacent section that is adjacent to the eleventh optical waveguide 111. Then, the twelfth optical waveguide 112 outputs the monitor light obtained from the eleventh optical waveguide 111 to the twelfth output port 110C. Furthermore, the monitor light is a portion of the signal light, and thus, has the same wavelength as that of the signal light.

The eleventh optical waveguide 111 is, for example, a straight line waveguide. The twelfth optical waveguide 112 includes a straight line waveguide and a bent waveguide in which both ends of a straight line waveguide are curved. The adjacent section of the straight line waveguide of the eleventh optical waveguide 111 and the adjacent section of the straight line waveguide of the twelfth optical waveguide 112 forms a directional coupler.

The length of each of the bent waveguides is defined as, for example, 2 μm, the length of the straight line waveguide of the twelfth optical waveguide 112 is defined as a length X that is the same length of the adjacent section of the eleventh optical waveguide 111 and is defined as, for example, 2.1 μm. Furthermore, a width w of the eleventh optical waveguide 111 is defined as 400 nm, the width w of the twelfth optical waveguide 112 is defined as 400 nm, the thickness of the eleventh optical waveguide 111 is defined as 0.22 μm, and the thickness of the twelfth optical waveguide 112 is also defined as 0.22 μm. Furthermore, an interval (gap) between the adjacent section of the eleventh optical waveguide 111 and the adjacent section of the twelfth optical waveguide 112 is defined as, for example, 200 nm.

In the tap coupler 110, a tap ratio is to be set in accordance with the length X of the adjacent section, that is, the length of the directional coupler. In the directional coupler, if the signal light is input from the adjacent section of the eleventh optical waveguide 111, by using a state in which the light gradually transitions to the adjacent section located at a position close to the twelfth optical waveguide 112 and adjusting the length X of the adjacent section, the directional coupler is able to adjust the optical power that transitions to the twelfth optical waveguide 112. In other words, the tap coupler 110 is able to change the tap ratio by adjusting the length X of the adjacent section between the eleventh optical waveguide 111 and the twelfth optical waveguide 112.

In the tap coupler 110, in order to reduce an electrical power consumption of the entirety of the optical communication apparatus, it is preferable to reduce an excessive loss in the signal light. In addition, the excessive loss mentioned here is a loss that is suffered by the signal light and that is greater than or equal to a loss (hereinafter, referred to as a principle loss) occurring by extracting power by an amount equal to a desired tap ratio from the signal light in the tap coupler 110. For example, in the case where the tap ratio of the tap coupler 110 is set to 5%, if it is assumed that no excessive loss is made, the power of the signal light corresponding to an output of the tap coupler 110 is 95% (loss of 0.22 dB). Accordingly, if the power of the signal light is 80% (loss of 0.97 dB), the excessive loss of the tap coupler 110 is 0.97−0.22=0.75 dB. In other words, the excessive loss is produced caused by a tap that exceeds the set tap ratio, an emission to the outside of the optical waveguide caused by diffusion.

Furthermore, in the optical communication apparatus, the technology of wavelength-division multiplexing that improves the transmission capacity of a single fiber is widely used and many different wavelengths are accordingly used, so that it is preferable that the tap coupler 110 have a structure in which the wavelength bands to be used are wideband and an excessive loss is small. Furthermore, it is preferable that the tap coupler 110 have a constant tap ratio in the wavelength bands that are used.

Patent Document 1: International Publication Pamphlet No. WO 2015/133344

Non-Patent Document 1: Hirohito Y., IEEE Photonics Technology Letters, 17, 3, Mar. 2005, p.p.585

In the optical communication apparatus using the wavelength-division multiplexing system, if power of the signal light to be monitored is changed caused by a wavelength, accurate power is not able to be detected, so that control accuracy of the detected power is degraded, thereby resulting in degradation of the quality of the signal.

The tap coupler 110 illustrated in FIG. 21 has a structure constructed in the case where the tap ratio is 5%. In addition, the tap ratio of 5% indicates that 5% of the power of the optical signal is tapped. Accordingly, on the basis of the structure of the tap coupler 110 illustrated in FIG. 21, a tap ratio and the wavelength dependence of an excessive loss are calculated by using the finite element method. It is assumed that the range of wavelength is the range between, for example, 1525 and 1570 nm including the C band that is used in the WDM system, and the excessive loss is a loss that is generated above the loss (in the case of 5%, 0.22 dB) of the signal light associated with the intended tap ratio.

FIG. 22 is a diagram illustrating an example of the relationship between a tap ratio and a wavelength in the tap coupler 110. In the directional coupler, as the wavelength is higher, an amount of leakage of the signal light to an optical electric field of the clad 113 that forms the eleventh optical waveguide 111 is increased, and the level of optical coupling to the adjacent twelfth optical waveguide 112 is increased. Consequently, as the wavelength of the signal light is higher, the tap ratio is also higher. Thus, when transition of the tap ratio illustrated in FIG. 22 is observed, even when the tap ratio of 5% is exhibited in the wavelength of 1525 nm, the tap ratio is 7.8% in the wavelength of 1570 nm, which indicates that the degree of fluctuation from the tap ratio associated with the wavelength of 1525 nm to the tap ratio associated with the wavelength of 1570 nm is 154%. The tap ratio of the tap coupler 110 is increased as the wavelength of the signal light is higher. In other words, it is found that the tap ratio of the tap coupler 110 has high wavelength dependence of the signal light.

FIG. 23 is a diagram illustrating the relationship between an excessive loss and a wavelength in the tap coupler 110. If the wavelength of the signal light is higher, this leads to an unintended loss of the signal light. When the transition of the excessive loss illustrated in FIG. 23 is observed, for example, in the wavelength of 1570 nm, an excessive loss of 0.13 dB is generated. The excessive loss of the tap coupler 110 is increased as the wavelength of the signal light is higher. In other words, it is found that the excessive loss of the tap coupler 110 also has high wavelength dependence of the signal light.

Accordingly, in the actual circumstances, for the tap coupler 110, there is a demand for a tap that is stable and less dependence on wavelengths.

SUMMARY

According to an aspect of an embodiment, a tap coupler includes a mode generation unit, a separation unit and an output unit. The mode generation unit generates, in accordance with a discontinuous portion that is disposed on a travelling path of signal light that is propagating, a first mode of the signal light and a second mode that is different from the first mode. The separation unit separates, when the first mode and the second mode are input from the mode generation unit, the first mode and the second mode. The output unit outputs branch light in accordance with a transition of the second mode received from the separation unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the present invention is not limited to the embodiments. In addition, the embodiments described below may also be used in any appropriate combination as long as the embodiments do not conflict with each other.

[a] First Embodiment

Figure 1:
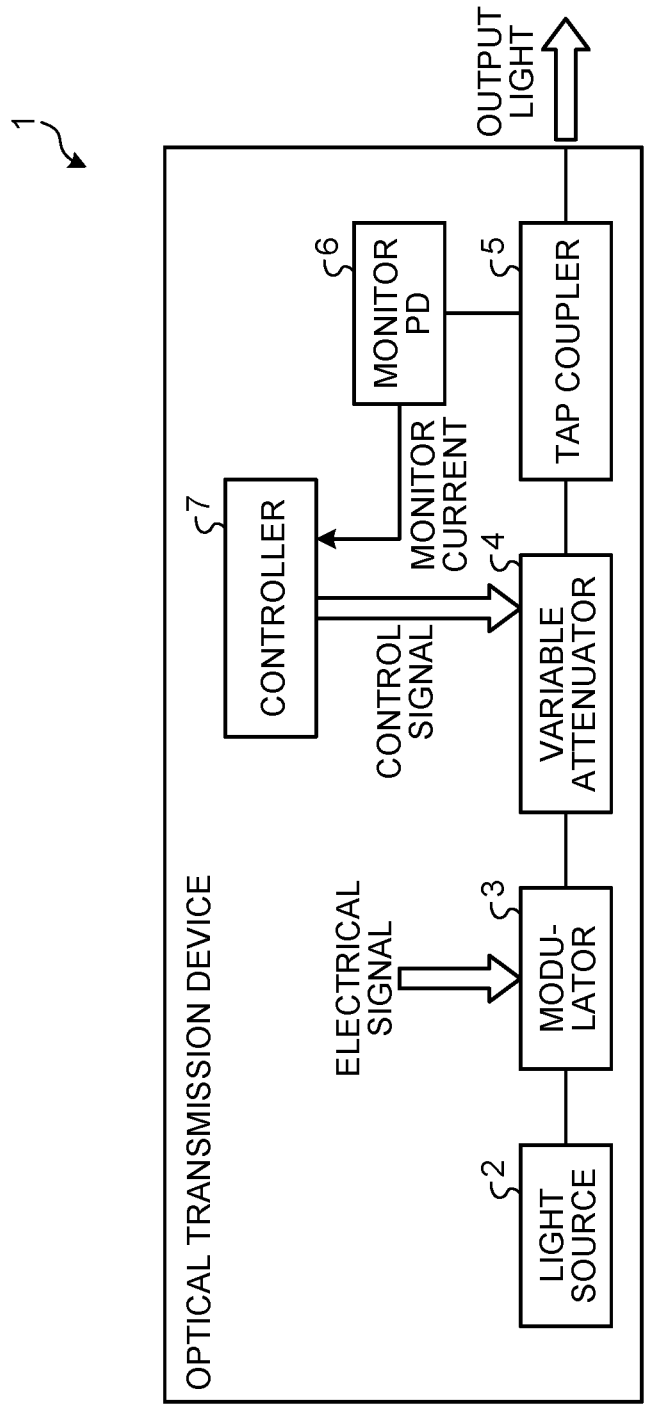
FIG. 1 is a block diagram illustrating an example of an optical transmission device according to a first embodiment.

FIG. 1 is a block diagram illustrating an example of an optical transmission device 1 according to a first embodiment. The optical transmission device 1 illustrated in FIG. 1 includes a light source 2, a modulator 3, a variable attenuator 4, a tap coupler 5, a monitor PD 6, and a controller 7. The light source 2 includes, for example, a laser diode or the like, generates local emission light at a predetermined wavelength, and supplies the generated light to the modulator 3. The modulator 3 generates signal light by modulating the signal light supplied from the light source 2 by using the electrical signal that is output from a digital signal processor (DSP) that is not illustrated, and then, outputs the generated signal light to the variable attenuator 4.

The variable attenuator 4 is an optical amplifier that adjusts the level of the signal light received from the modulator 3. The tap coupler 5 branches out the signal light that has been level adjustment performed by the variable attenuator 4 into signal light in a first mode S and branch light in a second mode M that is different from the first mode S. Furthermore, the first mode S is, for example, a transverse electric (TE) waveguide mode of 0 corresponding to the basic mode that is used to propagate the signal light. The second mode M is a higher-order mode of the signal light, such as a second-order waveguide mode TE2.

The monitor PD 6 is a detection unit that converts the branch light associated with the second mode M that has branched out at the tap coupler 5 to a monitor current value. The controller 7 is a control unit that outputs, to the variable attenuator 4 on the basis of the monitor current value associated with the monitor light of the monitor PD 6, a control signal that adjusts the level of the signal light that is an output of the signal light from the variable attenuator 4.

The variable attenuator 4 adjusts the level of the signal light in accordance with the control signal. Furthermore, a case has been described as an example in which the controller 7 controls the variable attenuator 4 on the basis of the monitor current value received from the monitor PD 6; however, the example is not limited to this, and another device that uses signal light may be controlled.

Figure 2:
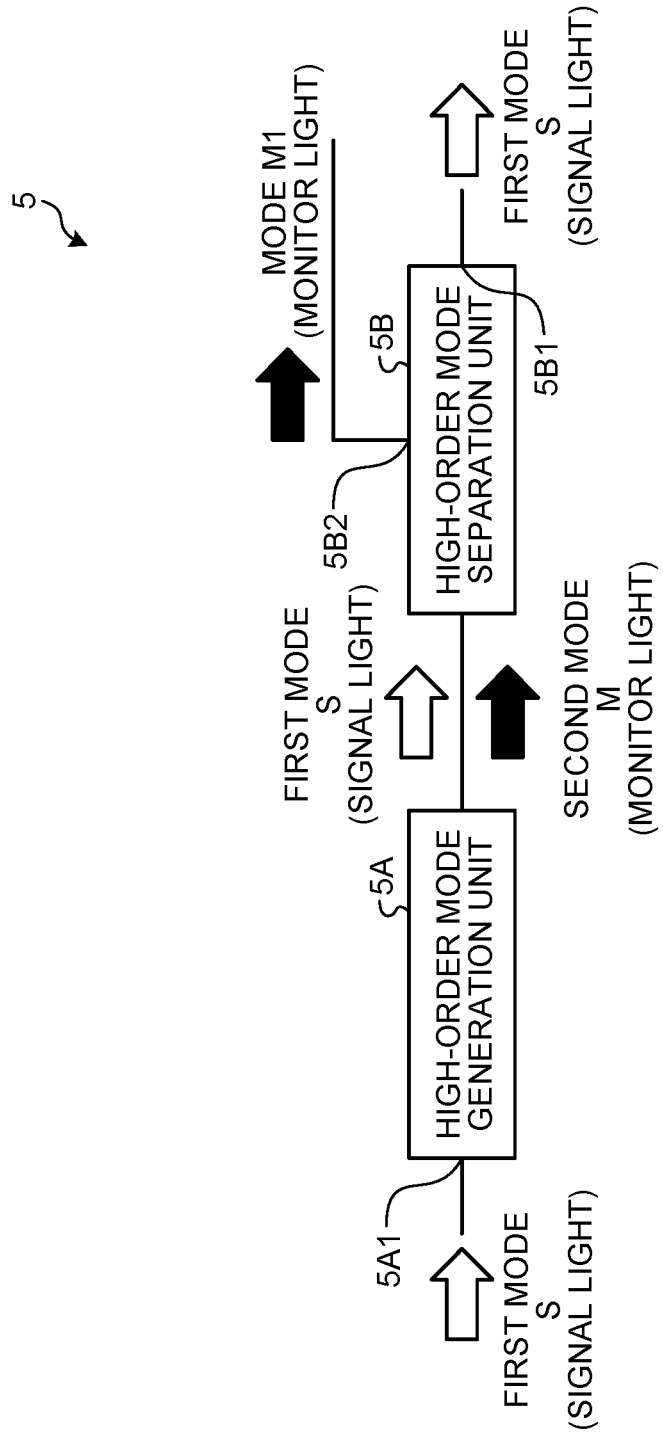
FIG. 2 is a diagram illustrating an example of a tap coupler.

FIG. 2 is a diagram illustrating an example of the tap coupler 5. The tap coupler 5 illustrated in FIG. 2 includes a high-order mode generation unit 5A and a high-order mode separation unit 5B. The high-order mode generation unit 5A is optically coupled to the high-order mode separation unit 5B. The high-order mode generation unit 5A is a mode generation unit that includes, for example, a first optical waveguide 10. The first optical waveguide 10 generates the first mode S and the second mode M that is different from the first mode S in accordance with a discontinuous portion that is disposed on the travelling path of the signal light. The high-order mode separation unit 5B is a separation unit 20 that includes, for example, a second optical waveguide 21 and a third optical waveguide 22. The high-order mode separation unit 5B inputs the first mode S and the second mode M from the high-order mode generation unit 5A and separates the first mode S and the mode M1 that is associated with the second mode M.

The tap coupler 5 includes an input port 5A1, a first output port 5B1, and a second output port 5B2. The input port 5A1 is a port that is optically coupled to the variable attenuator 4 and that inputs the signal light to the first optical waveguide 10. The first output port 5B1 is an output port of the second optical waveguide 21 that transmits and outputs the first mode S of the signal light that has been input from the first optical waveguide 10. The second output port 5B2 is an output port of the third optical waveguide 22 that is optically coupled to the monitor PD 6 and that outputs, as branch light, the mode M1 that is associated with the second mode M of the signal light that has been input from the first optical waveguide 10. The second output port 5B2 is an output unit.

Figure 3:
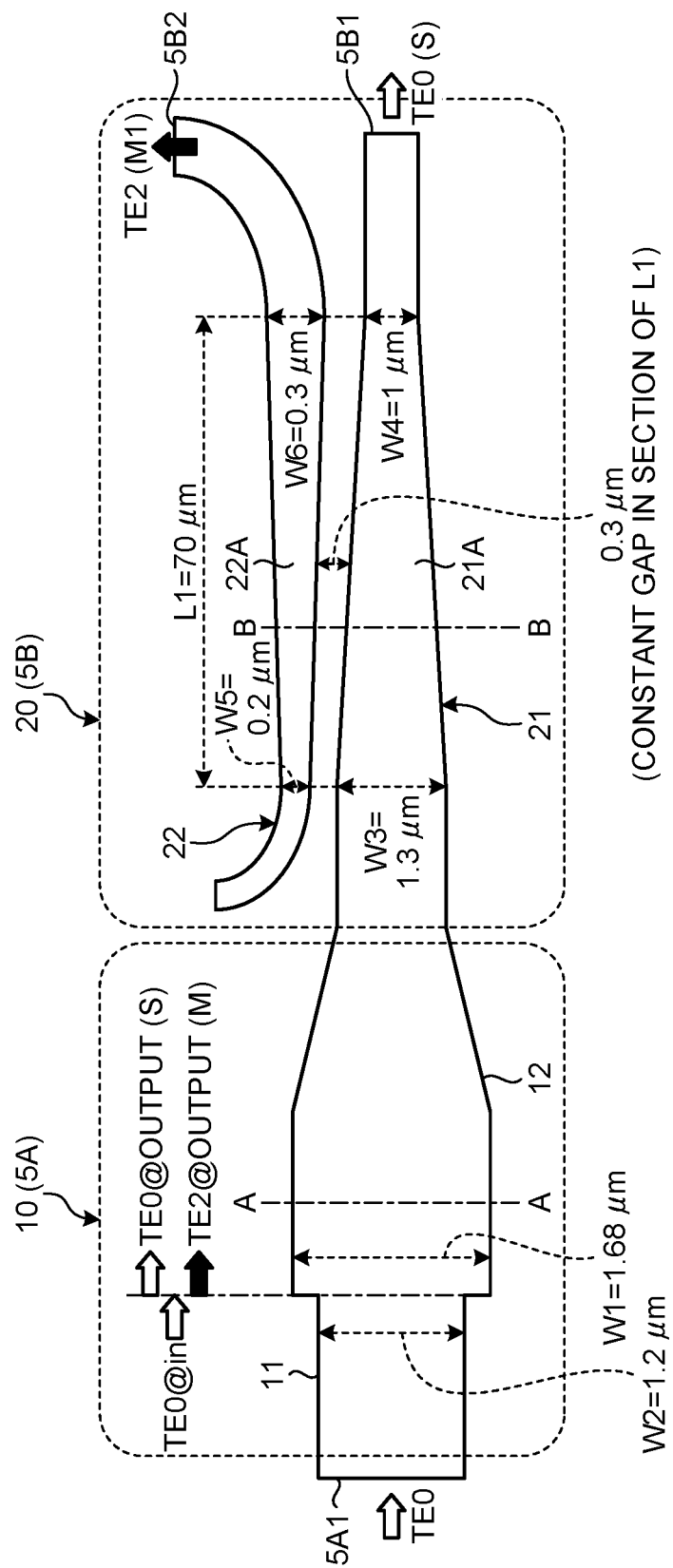
FIG. 3 is a top view illustrating an example of a core portion included in the tap coupler in which an upper side clad is not illustrated.
Figure 4:
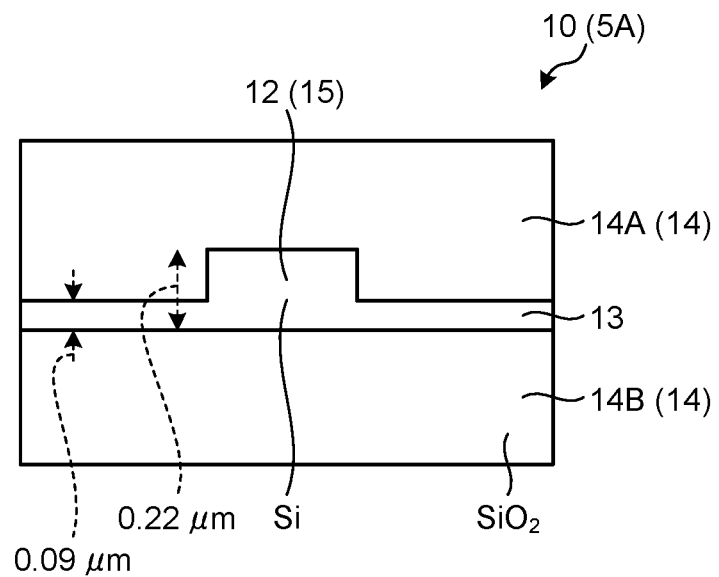
FIG. 4 is a cross-sectional view taken along line A-A of a first optical waveguide included in the tap coupler illustrated in FIG. 3.

FIG. 3 is a top view illustrating an example of a core portion included in the tap coupler 5 in which an upper side clad 14A is not illustrated, and FIG. 4 is a cross-sectional view taken along line A-A of the first optical waveguide 10 included in the tap coupler 5 illustrated in FIG. 3. The tap coupler 5 illustrated in FIG. 4 includes a core 15 that is formed on a substrate and a clad 14 that covers the core 15. The clad 14 includes the upper side clad 14A that covers the upper side of the core 15 and a lower side clad 14B that covers the lower side of the core 15. The material of the core 15 is, for example, Si. The material of the clad 14 is, for example, $SiO_2$.

The core 15 includes the first optical waveguide 10, the second optical waveguide 21 that is optically coupled to the first optical waveguide 10, and the third optical waveguide 22 that is disposed in parallel with the second optical waveguide 21. The first optical waveguide 10 generates, in accordance with a discontinuous portion of the signal light, the first mode S and the second mode M of the signal light. Energy of the first mode S of the signal light that is input to the discontinuous portion is distributed to the first mode S, which is the same, and the second mode M that is different from the first mode S in the waveguide mode.

If the first mode S and the second mode M are input from the first optical waveguide 10, the second optical waveguide 21 transmits the first mode S and outputs the first mode S to the first output port 5B1, and then, transitions the second mode M to the third optical waveguide 22. Furthermore, by transitioning the second mode M received from the second optical waveguide 21, the third optical waveguide 22 converts the second mode M to the mode M1 that is associated with the second mode M and outputs the converted mode M1 as branch light from the second output port 5B2. The mode M1 associated with the second mode M may be the second mode M that is the same, or may be a different mode that is associated with the second mode M.

The first optical waveguide 10 includes the discontinuous portion, for the signal light, that is constituted such that at least a core width of the first optical waveguide 10 is different by aligning the central axis that is along the traveling direction of the signal light that is propagating. The first optical waveguide 10 includes a fourth optical waveguide 11 and a fifth optical waveguide 12 that is optically coupled to the fourth optical waveguide 11. The core width W2 of the fourth optical waveguide 11 is different from a core width W1 of the fifth optical waveguide 12, so that the discontinuous portion for the signal light is constituted between the fourth optical waveguide 11 and the fifth optical waveguide 12. The core width W2 of the fourth optical waveguide 11 is defined as, for example, 1.2 µm, and the core width W1 of the fifth optical waveguide 12 is defined as, for example, 1.68 µm. The fifth optical waveguide 12 is a multi-mode waveguide through which two or more waveguide modes are propagated.

The second optical waveguide 21 and the third optical waveguide 22 constitute, for example, an insulation converter. The first optical waveguide 10, the second optical waveguide 21, and the third optical waveguide 22 are, for example, rib waveguides.

An interval (gap) between an adjacent section 21A of the second optical waveguide 21 and an adjacent section 22A of the third optical waveguide 22 is defined as, for example, 0.3 µm. The core width W3 of the adjacent section 21A of the second optical waveguide 21 is defined as, for example, 1.3 µm, and the core width W4 is defined as, for example, 1 µm. The core width W5 of the adjacent section 22A of the third optical waveguide 22 is defined as, for example, 0.2 µm, the core width W6 is defined as, for example, 0.3 µm. A length L1 of the adjacent section 21A of the second optical waveguide 21 is defined as, for example, 70 µm that is the same length as that of the adjacent section 22A of the third optical waveguide 22.

The core width of each of the second optical waveguide 21 and the third optical waveguide 22 is designed such that the effective refractive index of each of the second mode M and the mode M1 is switched on the basis of the magnitude of the effective refractive index between the input/output units of the insulation converter. Therefore, both of the effective refractive indices are configured to be matched in the vicinity of the center that is parallel to the traveling direction of the signal light passing through the insulation converter. As a result, the second mode M and the mode M1 interact with each other only in the vicinity of the center in the case where the second optical waveguide 21 and the third optical waveguide 22 are brought closer with each other. Furthermore, at least one of the second optical waveguide 21 and the third optical waveguide 22 has a tapered shape in which the core width or the like is continuously changed along the traveling direction of the light, and has a length that is sufficient for an occurrence of insulation conversion. As a result, the second mode M is converted to the mode M1 by way of an interaction exhibited in the vicinity of the center of the insulation converter. In other words, the second mode M is converted to the mode M1 in accordance with the transition of the second mode M occurring from the second optical waveguide 21 to the third optical waveguide 22.

In contrast, for the first mode S that has been input from the fifth optical waveguide 12, it is possible to design the core width of each of the second optical waveguide 21 and the third optical waveguide 22 such that the magnitude of the effective refractive index is not switched in the input/output units of the insulation converter to any of the mode of the second optical waveguide 21. As a result, an interaction is not exhibited in any mode, so that a mode conversion and a waveguide transition do not occur, and the second optical waveguide 21 accordingly transmits and outputs the first mode S from the first output port 5B1.

In addition, a case has been described as an example in which the insulation converter is constituted by the second optical waveguide 21 and the third optical waveguide 22, and an example in which the second mode M is converted to the mode M1 in accordance with a transition of the second mode M with respect to the third optical waveguide 22; however, the examples are not limited to these.

The mode is converted to the mode M1 that is associated with the second mode M by transitioning the second mode M from the second optical waveguide 21 to the third optical waveguide 22 in the adjacent sections 21A and 22A between the second optical waveguide 21 and the third optical waveguide 22. The third optical waveguide 22 outputs the converted mode M1 to the second output port 5B2. The second optical waveguide 21 transmits and outputs the first mode S to the first output port 5B1 without changing the mode.

The fifth optical waveguide 12 included in the first optical waveguide 10 illustrated in FIG. 4 includes the upper side clad 14A, the rib waveguide, and the lower side clad 14B. The rib waveguide includes a slab 13 and the core 15. The thickness of the slab 13 is defined as, for example, 0.09 µm, and the thickness of the core 15 of the fifth optical waveguide 12 is defined as, for example, 0.22 µm. Furthermore, the thickness of the slab 13 of the fourth optical waveguide 11 and the thickness of the core 15 are the same as the thicknesses of the fifth optical waveguide 12 and the slab 13 and the thickness of the core 15, respectively.

Figure 5:
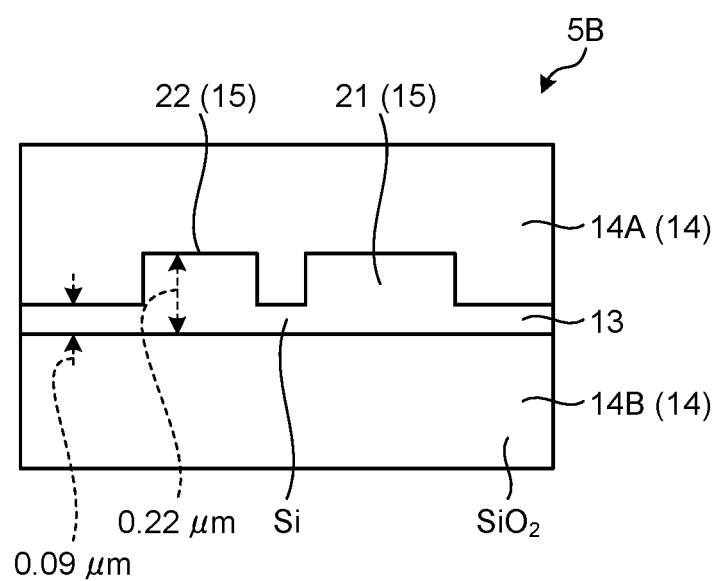
FIG. 5 is a cross-sectional view taken along line B-B of a second optical waveguide and a third optical waveguide included in the tap coupler illustrated in FIG. 3.

FIG. 5 is a cross-sectional view taken along line of B-B of the second optical waveguide 21 and the third optical waveguide 22 included in the tap coupler 5 illustrated in FIG. 3. The second optical waveguide 21 and the third optical waveguide 22 illustrated in FIG. 5 have the upper side clad 14A, the rib waveguide, and the lower side clad 14B. The rib waveguide includes the slab 13 and the core 15. The thickness of the slab 13 is defined as, for example, 0.09 µm, and the thickness of the core 15 of each of the second optical waveguide 21 and the third optical waveguide 22 is defined as, for example, 0.22 µm.

In the following, before and after the discontinuous portion of the signal light of the first optical waveguide 10 described above, that is, how the electric field is changed at the time of an input and output of the signal light will be described. An electric field vector of each of the input/output modes is expanded as Equation 1.

$$E_{TE0@in} = C_{TE0}E_{TE0@out} + C_{TE2}E_{TE2@out} + \sum_i C_i E_i$$

Figure 6:
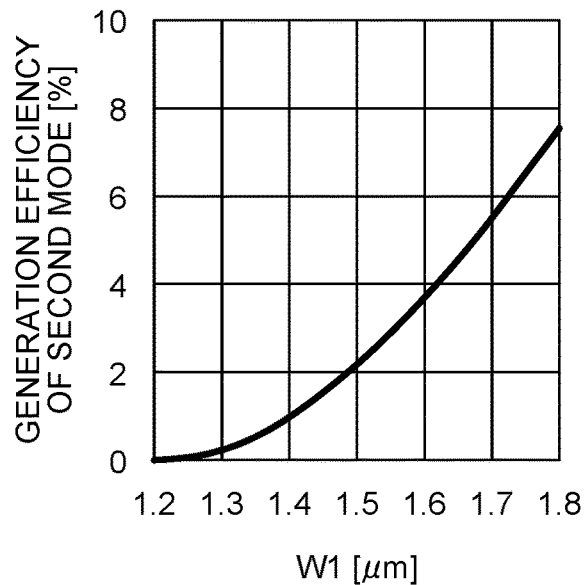
FIG. 6 is a diagram illustrating an example of the relationship between generation efficiency of a second mode and the width of a fifth optical waveguide.
Figure 7:
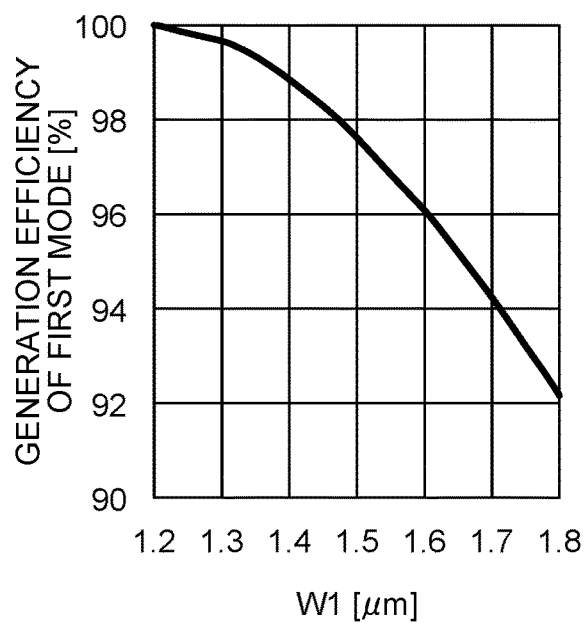
FIG. 7 is a diagram illustrating an example of the relationship between the generation efficiency of a first mode and the width of the fifth optical waveguide.
Figure 8:
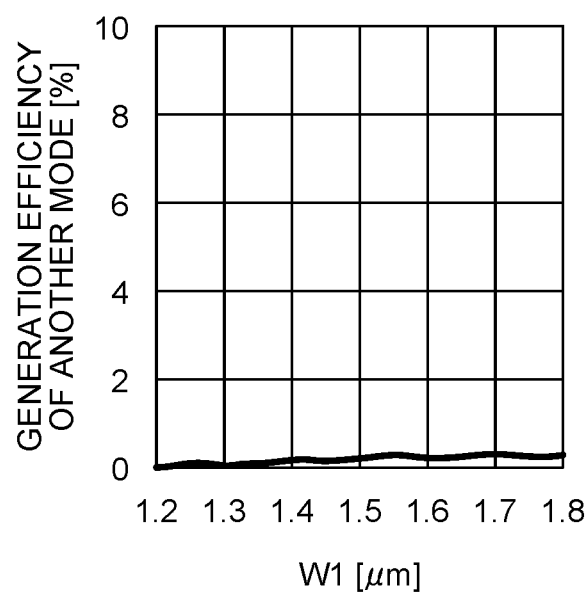
FIG. 8 is a diagram illustrating an example of the relationship between the generation efficiency of a mode other than the first mode and the second mode and the width of the fifth optical waveguide.

$C_{TE0}$: $TE0$ @ conversion coefficient to output $C_{TE2}$: $TE2$ @ conversion coefficient to output $C_i$: conversion coefficient to waveguide mode other than $TE0$ and $TE2$ Here, the high-order mode generation unit 5A has a symmetrical structure with respect to the central axis in the traveling direction of the signal light and is not optically coupled to TE2i+1 (i=0, 1 . . . ) that is an anti-symmetrical electric field distribution. FIG. 6 to FIG. 8 illustrate the result obtained by calculating, by using the finite element method, the generation efficiency of the first mode S, the generation efficiency of the second mode M, and the generation efficiency of the mode that is other than the first mode S and the second mode M in the case where the core width W1 of the fifth optical waveguide 12 is changed. The wavelength of the signal light is defined as 1.57 µm. Furthermore, the square of the absolute value of the conversion coefficient corresponds to the generation efficiency.

FIG. 6 is a diagram illustrating an example of the relationship between the generation efficiency of the second mode M and the width W1 of the fifth optical waveguide 12. The generation efficiency of the second mode M is increased as the width W1 of the fifth optical waveguide 12 is increased. Therefore, it is possible to adjust the generation efficiency of the second mode M by adjusting the core width W1 of the fifth optical waveguide 12.

FIG. 7 is a diagram illustrating the relationship between the generation efficiency of the first mode S and the width W1 of the fifth optical waveguide 12. The generation efficiency of the first mode S is decreased as the width W1 of the fifth optical waveguide 12 is broaden. Therefore, it is possible to adjust the generation efficiency of the first mode S by adjusting the core width W1 of the fifth optical waveguide 12.

FIG. 8 is a diagram illustrating an example of the relationship between the generation efficiency of another mode other than the first mode S and the second mode M and the width W1 of the fifth optical waveguide 12. The generation efficiency of the other mode remains less than or equal to 0.5% even when the width W1 of the fifth optical waveguide 12 is increased. In other words, it is possible to suppress the generation efficiency of the other mode, which causes an excessive loss with respect to the first mode S and the second mode M, to be less than or equal to 0.5%.

In general, at the time of a transition to a different mode, the shape of the electric field distribution is similar as the order of the mode is closer, so that a transitional efficiency is increased. Regarding a mode TE0 at the $0^{th}$ order, for example, the shape of the electric field distribution is similar to the mode TE2 at the $2^{nd}$ order as compared to a mode TE4 at the $4^{th}$ order, the mode TE2 at the $2^{nd}$ order easily transitions from the mode TE0 at the $0^{th}$ order to the $2^{nd}$ order. The order of the mode is related to the shape of a standing wave in the optical waveguide, so that a difference in number of antinodes of the standing wave is increased as a difference in the order is increased, and thus, a difference in the shape of the electric field distribution is increased. Furthermore, in the case where a small amount of power is extracted as with the tap coupler 5, there is no need to increase the size of the discontinuous portion for the signal light, so that perturbative approximation holds, and thus, with respect to the mode that has been input, it is possible to almost expand the electric field vector of the input mode by using the two modes, i.e., the same mode and the mode that is closer thereto. As a result, the generation efficiency of the other mode that is other than the first mode S (TE0) and the second mode M (TE2) at the $2^{nd}$ order is low and the excessive loss is reduced.

Figure 9:
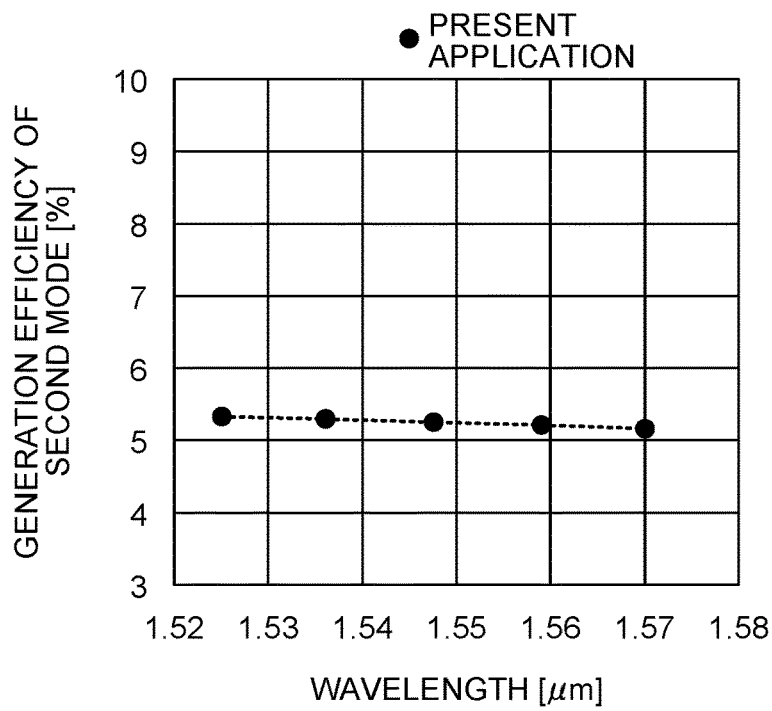
FIG. 9 is a diagram illustrating an example of the relationship between the generation efficiency of the second mode and the wavelength in the first optical waveguide.

FIG. 9 indicates, to study the characteristics of the high-order mode generation unit 5A, in order to generate about 5% of the generation efficiency of the second mode M, the calculation result of the wavelength dependence in the case where the core width W1 of the fifth optical waveguide 12 is defined as 1.68 µm. FIG. 9 is a diagram illustrating an example of the relationship between the generation efficiency of the second mode M in the first optical waveguide 10 and the wavelength. For example, if the wavelength is in the range between 1.525 and 1.57 µm, the generation efficiency of the second mode M is the range between, for example, 5.17 and 5.34% as illustrated in FIG. 9. An amount of variation in the generation efficiency of the second mode M is small even if the wavelength of the signal light is changed and is accordingly stable. Therefore, the generation efficiency of the second mode M is stable because the ratio of the maximum generation efficiency to the minimum generation efficiency is 103%, and it is found that the wavelength dependence with respect to the generation efficiency of the second mode M.

Figure 10:
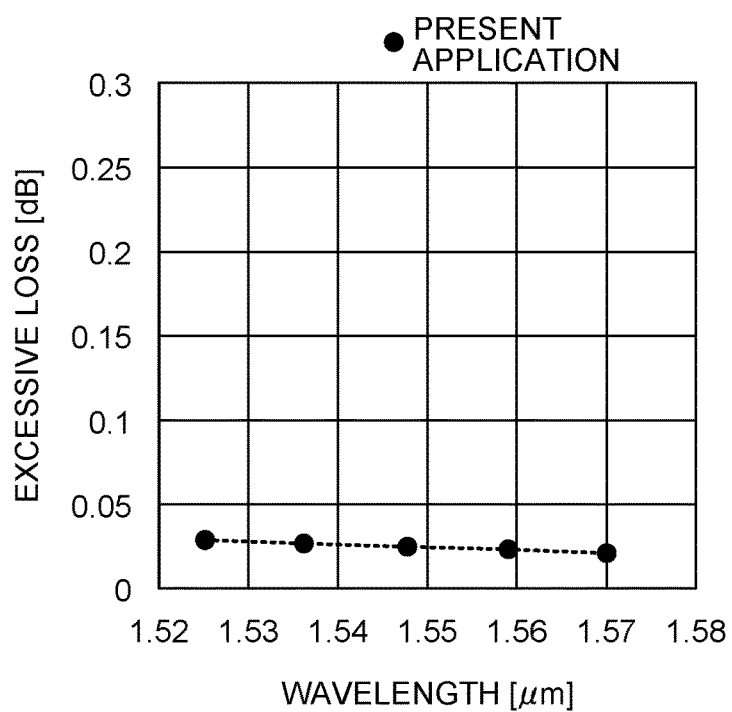
FIG. 10 is a diagram illustrating an example of the relationship between an excessive loss and a wavelength in the first optical waveguide.

FIG. 10 is a diagram illustrating an example of the relationship between an excessive losses and a wavelength in the first optical waveguide 10. As illustrated in FIG. 10, an amount of variation in the excessive loss of the first mode S is small even if the wavelength of the signal light is changed and is able to be suppressed at the level that is less than or equal to, for example, 0.03 dB. In other words, it is found that the wavelength dependence of the excessive loss of the first mode S is also very small.

This is because, if the wavelength of the signal light has been changed, the electric field distribution of the optical waveguide is changed, but if, for example, the wavelength of the signal light is high, an amount of the optical electric field leaking to the clad 14 is increased, so that the optical electric field is increased. Regarding the conversion efficiency of the discontinuous portion calculated from an overlap integral between the fourth optical waveguide 11 and the fifth optical waveguide 12, the electric field distribution is changed such that the electric fields of both of the fourth optical waveguide 11 and the fifth optical waveguide 12 are the same. For example, if the wavelength of the signal light is high, the electric field distribution of each of the first mode S (TE0@input), the first mode S (TE0@output), and the second mode M (TE2@output) is broaden. A variation in change in the conversion efficiency that is calculated from the ratio (overlap integral) in a portion in which these two electric fields overlap is small. In other words, the wavelength dependence is theoretically small. Furthermore, based on the same reason, if the waveguide width or the like is changed due to a manufacturing error or the like, an amount of variation in the generation efficiency of the second mode M is also small and the manufacturing tolerance is also increased.

Figure 11:
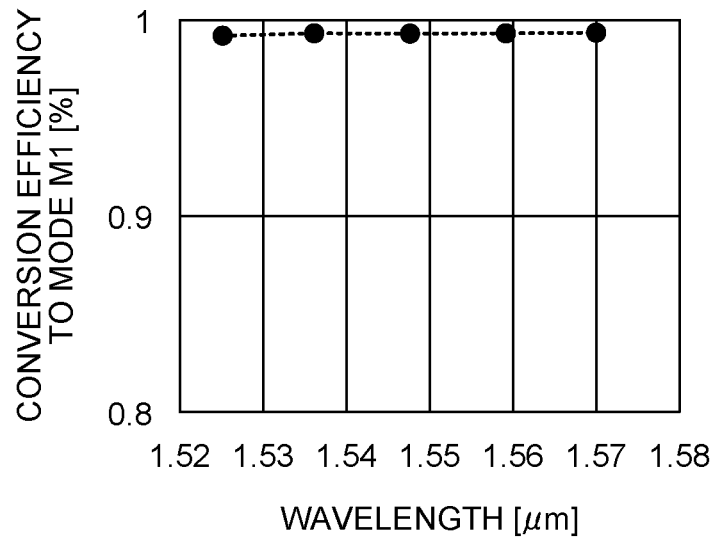
FIG. 11 is a diagram illustrating an example of the relationship between conversion efficiency from a the second mode M to a mode M1 and a wavelength in each of the second optical waveguide and the third optical waveguide.

In order to study the characteristics of the high-order mode separation unit 5B, the calculation results of the characteristics that are obtained when the wavelength of the signal light is changed and that are calculated by using the finite difference time domain method is described below. FIG. 11 is a diagram illustrating an example of the relationship between the conversion efficiency from the second mode M to the mode M1 and the wavelength in the second optical waveguide 21 and the third optical waveguide 22. As illustrated in FIG. 11, an amount of variation in the conversion efficiency from the second mode M to the mode M1 is small even if the wavelength of the signal light is changed and is greater than or equal to, for example, 99.2%.

Figure 12:
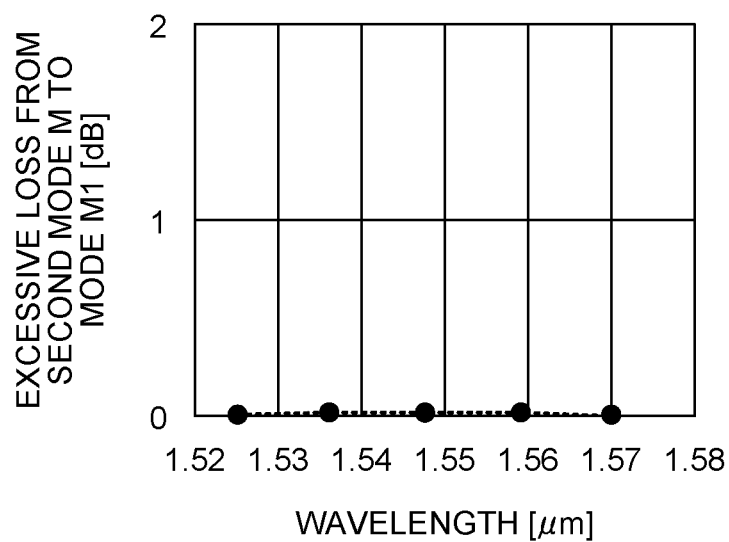
FIG. 12 is a diagram illustrating an example of the relationship between an excessive loss from the second mode M to the mode M1 and a wavelength in each of the second optical waveguide and the third optical waveguide.

FIG. 12 is a diagram illustrating an example of the relationship between an excessive loss from the second mode M to the mode M1 and a wavelength in the second optical waveguide 21 and the third optical waveguide 22. As illustrated in FIG. 12, an amount of variation in the excessive loss from the second mode M to the mode M1 is small even if the wavelength of the signal light is changed and is less than or equal to 0.01 dB. Therefore, the high-order mode separation unit 5B is able to obtain the signal light in the mode M1 as the branch light even if the used wavelength band that is a wide band.

Figure 13:
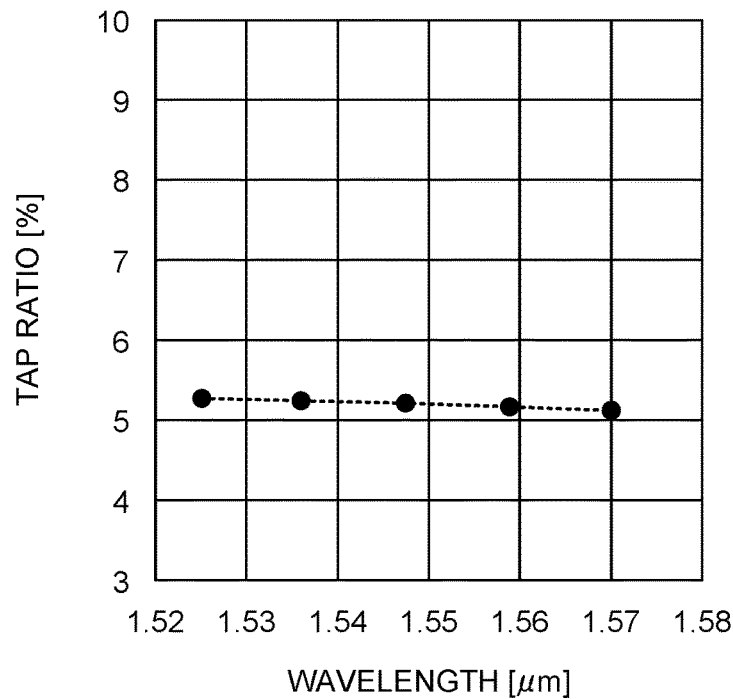
FIG. 13 is a diagram illustrating an example of the relationship between a tap ratio and a wavelength in the tap coupler.

In other words, the tap coupler 5 includes the high-order mode generation unit 5A and the high-order mode separation unit 5B in each of which the wavelength dependence is small. In the case where, in the tap coupler 5, a tap ratio is defined as, for example, 5%, and the core width W1 of the fifth optical waveguide 12 is defined as 1.68 µm, the results of calculating the tap ratio and the excessive loss of the first mode S will be described with reference to FIG. 13 and FIG. 14. Furthermore, the excessive loss means a loss that is generated at, as a principle loss at the time of the tap of 5%, (−10*log10 (1−0.05)=0.22 dB) or above. FIG. 13 is a diagram illustrating an example of the relationship between a tap ratio and a wavelength in the tap coupler 5. An amount of variation in the tap ratio illustrated in FIG. 13 is small even if the wavelength of the signal light is changed, and is accordingly stable.

Figure 14:
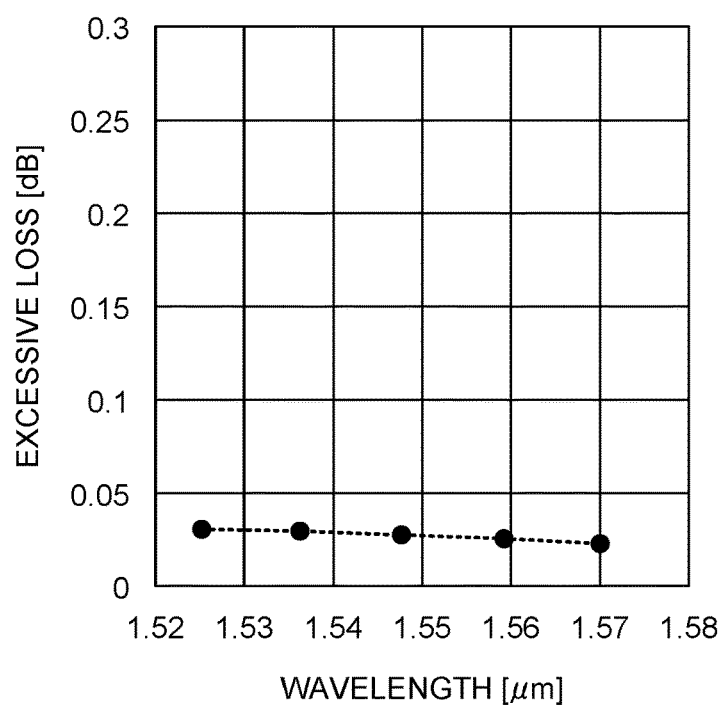
FIG. 14 is a diagram illustrating an example of the relationship between excessive losses and wavelengths in the tap coupler.

FIG. 14 is a diagram illustrating an example of the relationship between an excessive loss and a wavelength in the tap coupler 5. An amount of variation in the excessive loss illustrated in FIG. 14 is small even if the wavelength of the signal light is changed, and remains small. As a result, it is possible to implement the stable tap coupler 5 in which the wavelength dependence is small and the used wavelength band is a wide band and the excessive loss is low.

The tap coupler 5 according to the first embodiment includes the first optical waveguide 10, the second optical waveguide 21, and the third optical waveguide 22, and the first optical waveguide 10 generates the first mode S and the second mode M of the signal light in accordance with the discontinuous portion that is disposed on the travelling path of the propagation signal light. If the first mode S and the second mode M are input from the first optical waveguide 10, the second optical waveguide 21 transmits the first mode S, and also, transitions the second mode M to the third optical waveguide 22. The third optical waveguide 22 converts the second mode M to the mode M1 in accordance with a transition of the second mode M received from the second optical waveguide 21, and outputs the converted mode M1 as branch light. As a result, the tap coupler 5 is able to ensure a stable tap in which the wavelength dependence is small, a wavelength band that can be used is a wide band, and an excessive loss is low.

The first optical waveguide 10 includes a discontinuous portion that is constituted such that at least the core width of the first optical waveguide 10 is different by aligning the central axis that is along the traveling direction of the signal light that is propagating. As a result, it is possible to easily generate the first mode S and the second mode M of the signal light at the discontinuous portion.

The first optical waveguide 10 generates the first mode S and the second mode M in accordance with the discontinuous portion of the signal light by optically coupling the portion between the fourth optical waveguide 11 and the fifth optical waveguide 12 that has a different width from the width of the fourth optical waveguide 11. Furthermore, if the first mode S and the second mode M are input from the first optical waveguide 10, the second optical waveguide 21 transmits and outputs the first mode S, and transitions the second mode M to the third optical waveguide 22. The third optical waveguide 22 outputs, as the branch light, the mode M that is associated with the second mode M that has been transitioned and received from the second optical waveguide 21. As a result, the tap coupler 5 is able to ensure a stable tap in which the wavelength dependence is small, a wavelength band that can be used is a wide band, and an excessive loss is low.

The optical transmission device 1 includes the monitor PD 6 that is optically coupled to the third optical waveguide 22 and that detects the mode M1 received from the third optical waveguide 22, and the controller 7 that controls, on the basis of the monitoring result of the mode M1 of the monitor PD 6, the variable attenuator 4 that adjusts the level of the signal light. As a result, by adjusting the level of the signal light of the variable attenuator 4 with high accuracy, in the optical transmission device 1, it is possible to suppress the degradation of the quality of the signal by stably outputting the signal light at the maximum output level.

The waveguide structure of each of the first optical waveguide 10, the second optical waveguide 21, and the third optical waveguide 22 is a rib waveguide. As a result, in the rib waveguide, light is also leaked to the slab 13, so that roughness of the side wall of the core 15 is less affected, and it is thus possible to optical propagation at low loss.

The core 15 is made of silicon, the clad 14 is made of $SiO_2$, and the tap coupler 5 is formed by using a silicon photonic technology. As a result, it is possible to form the monitor PD 6 that is made using Ge on the same chip, so that the entire size of the optical transmission device 1 is able to be reduced.

The first optical waveguide 10 is constituted by aligning the central axis of the fourth optical waveguide 11 and the central axis of the fifth optical waveguide 12 and having a symmetrical structure with respect to the central axis along the traveling direction of the signal light. As a result, in the first optical waveguide 10, the first mode S and the second mode M are mainly generated due to a symmetrical electric field distribution, so that the first optical waveguide 10 is able to efficiently generate the first mode S and the second mode M.

In the high-order mode generation unit 5A, the wavelength dependence of an amount of conversion from the first mode S to the second mode M is small. Furthermore, in the high-order mode separation unit 5B, spatial separation of different waveguide modes is easily performed, so that the high-order mode separation unit 5B is able to easily separate the first mode S and the second mode M. As a result, it is possible to implement the tap coupler 5 in which the wavelength dependence is small, a wavelength band that can be used is a wide band, and an excessive loss is low.

A case has been described as an example in which the third optical waveguide 22 according to the present embodiment outputs, as branch light, the mode M1 that is different from the second mode M in accordance with the transition of the second mode M received from the second optical waveguide 21. However, the third optical waveguide 22 may output the second mode M as branch light instead of the different mode M1, and appropriate modifications are possible.

A case has been described as an example in which the first optical waveguide 10 generates the first mode S and the second-order second mode M from the signal light in accordance with the discontinuous portion. However, the first optical waveguide 10 is not limited to the second-order mode as the second mode M, but may be, for example, another higher-order mode, such as a third-order mode or a fourth-order mode, and appropriate modifications are possible.

In addition, the structure of the first optical waveguide 10 included in the tap coupler 5 according to the first embodiment is the structure such that the fourth optical waveguide 11 and the fifth optical waveguide 12 illustrated in FIG. 3 are optically coupled; however, the example is not limited to this, and an embodiment thereof will be described below as a second embodiment.

[b] Second Embodiment

Figure 15A:
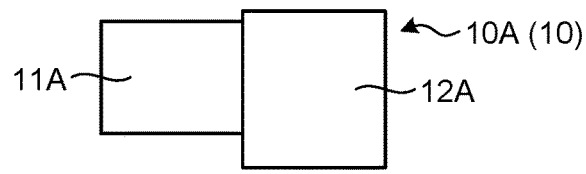
FIG. 15A is a diagram illustrating a modification of the core portion included in the first optical waveguide.
Figure 15B:
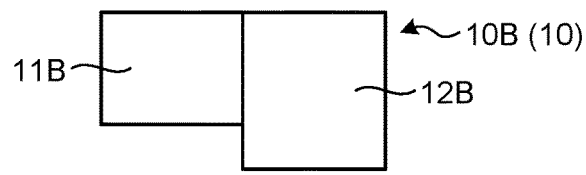
FIG. 15B is a diagram illustrating a modification of the core portion included in the first optical waveguide.
Figure 15C:
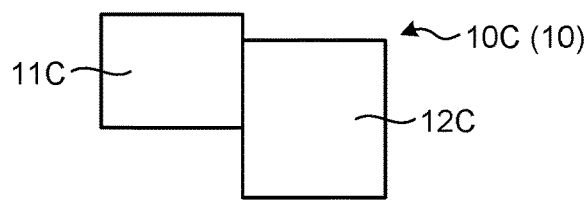
FIG. 15C is a diagram illustrating a modification of the core portion included in the first optical waveguide.

FIG. 15A, FIG. 15B and FIG. 15C are a diagram illustrating a modification of the core portion of the first optical waveguide 10. Furthermore, by assigning the same reference numerals to components having the same configuration as those in the tap coupler 5 according to the first embodiment, overlapped descriptions of the configuration and the operation thereof will be omitted. A first optical waveguide 10A illustrated in FIG. 15A includes a fourth optical waveguide 11A and a fifth optical waveguide 12A that is optically coupled to the fourth optical waveguide 11A. Furthermore, both of the optical waveguides are constituted such that the central axis of the fourth optical waveguide 11A is different from the central axis of the fifth optical waveguide 12A. The fifth optical waveguide 12A has the core width W1 and the fourth optical waveguide 11A has the core width W2, so that the discontinuous portion between the fourth optical waveguide 11A and the fifth optical waveguide 12A is able to generate the first mode S and the second mode M in accordance with an input of signal light.

A first optical waveguide 10B illustrated in FIG. 15B includes a fourth optical waveguide 11B and a fifth optical waveguide 12B that is optically coupled to the fourth optical waveguide 11B. Furthermore, both of the optical waveguides are constituted such that the central axis of the fourth optical waveguide 11B is different from the central axis of the fifth optical waveguide 12B. The fifth optical waveguide 12B has the core width W1 and the fourth optical waveguide 11B has the core width W2, so that the discontinuous portion between the fourth optical waveguide 11B and the fifth optical waveguide 12B is able to generate the first mode S and the second mode M in accordance with an input of signal light.

A first optical waveguide 10C illustrated in FIG. 15C includes a fourth optical waveguide 11C and a fifth optical waveguide 12C that is optically coupled to the fourth optical waveguide 11C. Furthermore, both of the optical waveguides are constituted such that the central axis of the fourth optical waveguide 11C is different from the central axis of the fifth optical waveguide 12C. The fifth optical waveguide 12C has the core width W1 and the fourth optical waveguide 11C has the core width W2, so that the discontinuous portion between the fourth optical waveguide 11C and the fifth optical waveguide 12C is able to generate the first mode S and the second mode M in accordance with an input of signal light.

Figure 16A:
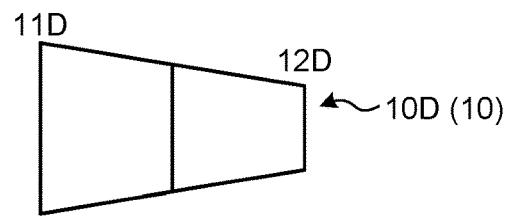
FIG. 16A is a diagram illustrating a modification of the core portion included in the first optical waveguide.
Figure 16B:
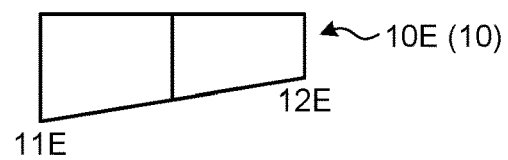
FIG. 16B is a diagram illustrating a modification of the core portion included in the first optical waveguide.

FIG. 16A and FIG. 16B are a diagram illustrating a modification the core portion of the first optical waveguide 10. A first optical waveguide 10D illustrated in FIG. 16A is formed in a continuous tapered shape, and includes a fourth optical waveguide 11D and a fifth optical waveguide 12D that is optically coupled to the fourth optical waveguide 11D. In the case where a distance of a continuous tapered waveguide is small, even if the structure of the waveguide is continuous, propagation of signal light is discontinuous. The core width of the fifth optical waveguide 12D is different from the core width of the fourth optical waveguide 11D, so that the discontinuous portion between the fourth optical waveguide 11D and the fifth optical waveguide 12D is able to generate the first mode S and the second mode M in accordance with an input of signal light.

A first optical waveguide 10E illustrated in FIG. 16B is formed in a continuous tapered shape, and includes a fourth optical waveguide 11E and a fifth optical waveguide 12E that is optically couple to the fourth optical waveguide 11E. The core width of the fifth optical waveguide 12E is different from the core width of the fourth optical waveguide 11E, so that the discontinuous portion between the fourth optical waveguide 11E and the fifth optical waveguide 12E is able to generate the first mode S and the second mode M in accordance with an input of signal light.

[c] Third Embodiment

Figure 17A:
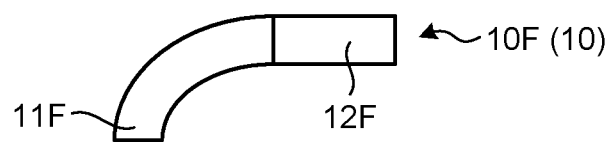
FIG. 17A is a diagram illustrating a modification of the core portion included in the first optical waveguide.
Figure 17B:
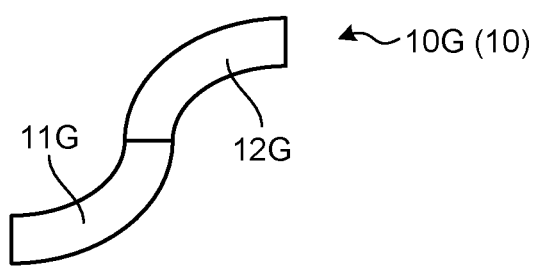
FIG. 17B is a diagram illustrating a modification of the core portion included in the first optical waveguide.

FIG. 17A and FIG. 17B are a diagram illustrating a modification of the core portion of the first optical waveguide 10. A first optical waveguide 10F illustrated in FIG. 17A includes a fourth optical waveguide 11F and a fifth optical waveguide 12F that is optically coupled to the fourth optical waveguide 11F. The fourth optical waveguide 11F is a straight line waveguide, whereas the fifth optical waveguide 12F is a bent waveguide with an arc type. In an electric field distribution of the mode that is propagated through bent waveguide with the arc type, an electric field is distorted in an outside direction, so that the electric field distribution is slightly different from that of the mode propagated through the straight line waveguide. Accordingly, it is possible to generate a different mode by using this discontinuity. Each of the fourth optical waveguide 11F and the fifth optical waveguide 12F is able to generate the first mode S and the second mode M in accordance with an input of signal light.

A first optical waveguide 10G illustrated in FIG. 17B includes a fourth optical waveguide 11G and a fifth optical waveguide 12G that is optically coupled to the fourth optical waveguide 11G. The fourth optical waveguide 11G is a bent waveguide having an arc shape, whereas the fifth optical waveguide 12G is a bent waveguide in which the bent direction of the fourth optical waveguide 11G is the inverse direction. In other words, the fourth optical waveguide 11G and the fifth optical waveguide 12G form a bent waveguide in an S bend shape. The bent waveguide having the S bend is able to generate different modes as a result of an occurrence of discontinuity due to different arcs each having a different bent direction. Each of the fourth optical waveguide 11G and the fifth optical waveguide 12G is able to generate the first mode S and the second mode M in accordance with an input of signal light.

In addition, a case has been described as an example in which the tap coupler 5 according to the first to the third embodiments is built into the optical transmission device 1; however, the example is not limited to the optical transmission device 1, but may be built in another device, such as an optical reception device 1A, and an embodiment thereof will be described below as a fourth embodiment. Furthermore, by assigning the same reference numerals to components having the same configuration as those in the optical transmission device 1 according to the first embodiment, overlapped descriptions of the configuration and the operation thereof will be omitted.

[d] Fourth Embodiment

Figure 18:
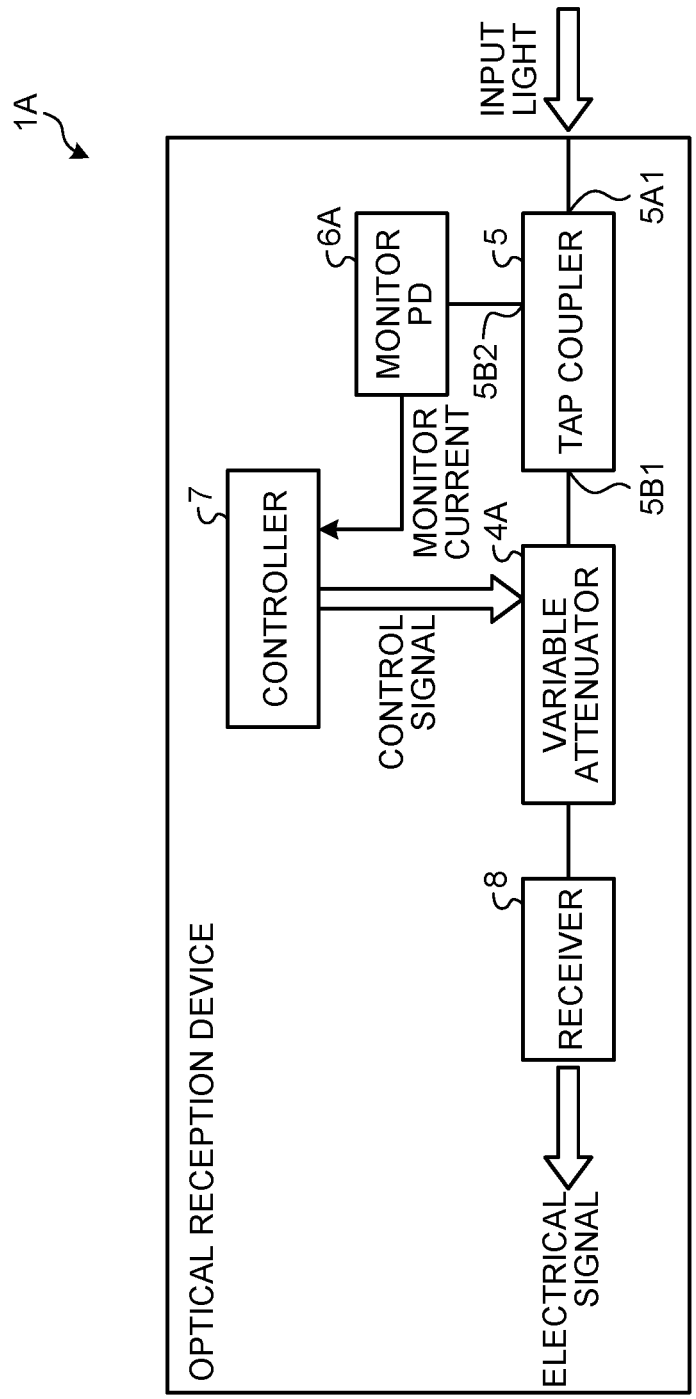
FIG. 18 is a diagram illustrating an example of an optical reception device according to a fourth embodiment.
Figure 19:
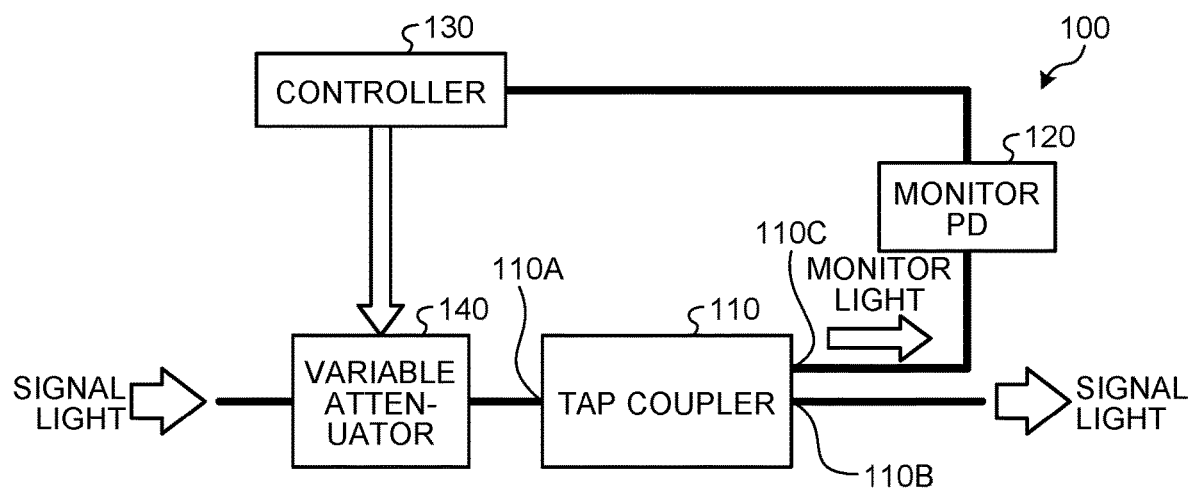
FIG. 19 is a diagram illustrating an example of using the tap coupler.
Figure 20:
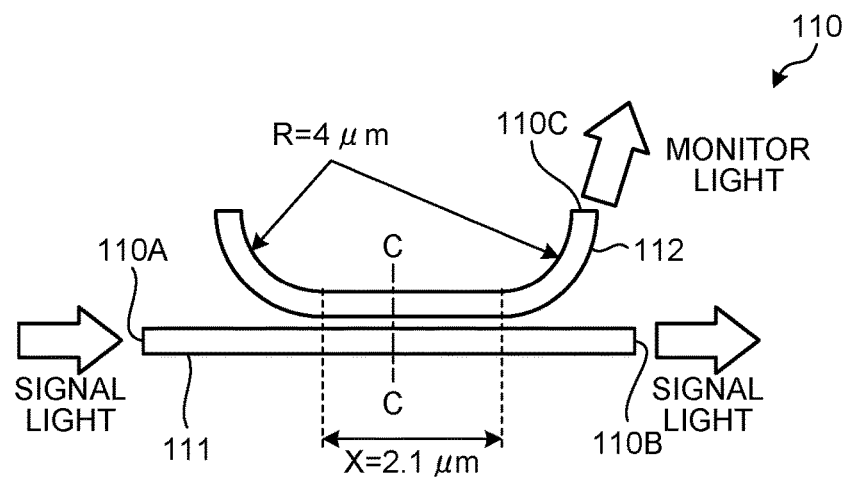
FIG. 20 is a plan view illustrating an example of the core portion included in the tap coupler.
Figure 21:
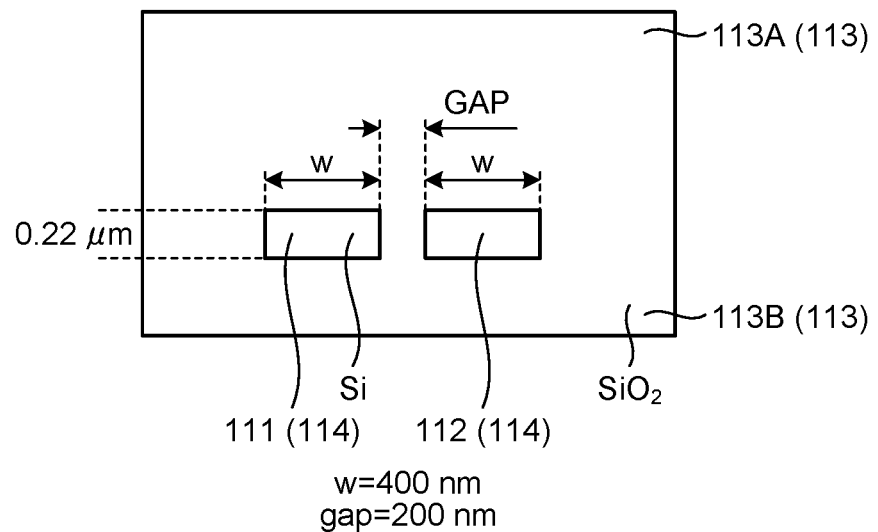
FIG. 21 is a cross-sectional view taken along line C-C of the tap coupler illustrated in FIG. 20.
Figure 22:
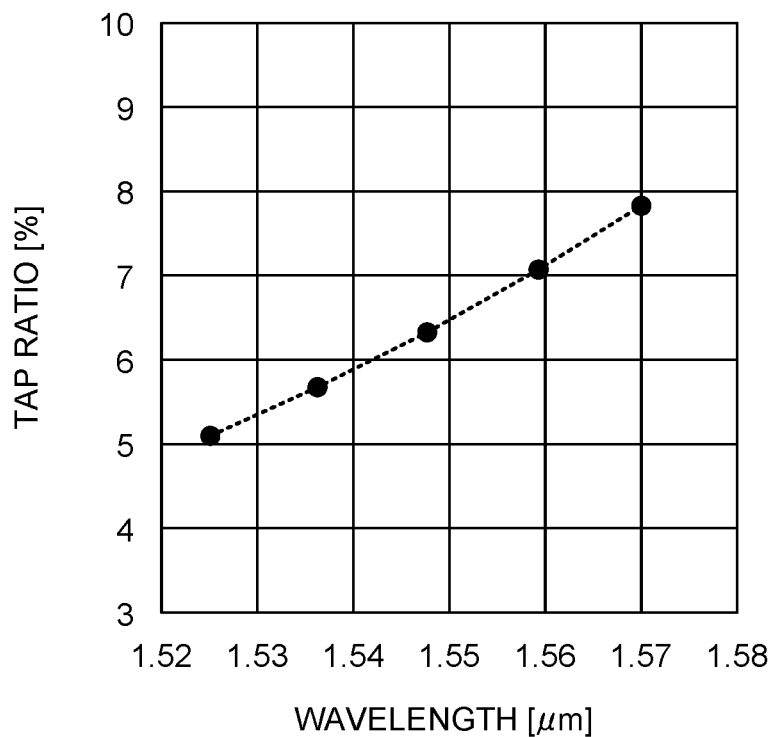
FIG. 22 is a diagram illustrating an example of the relationship between a tap ratio and a wavelength in the tap coupler.
Figure 23:
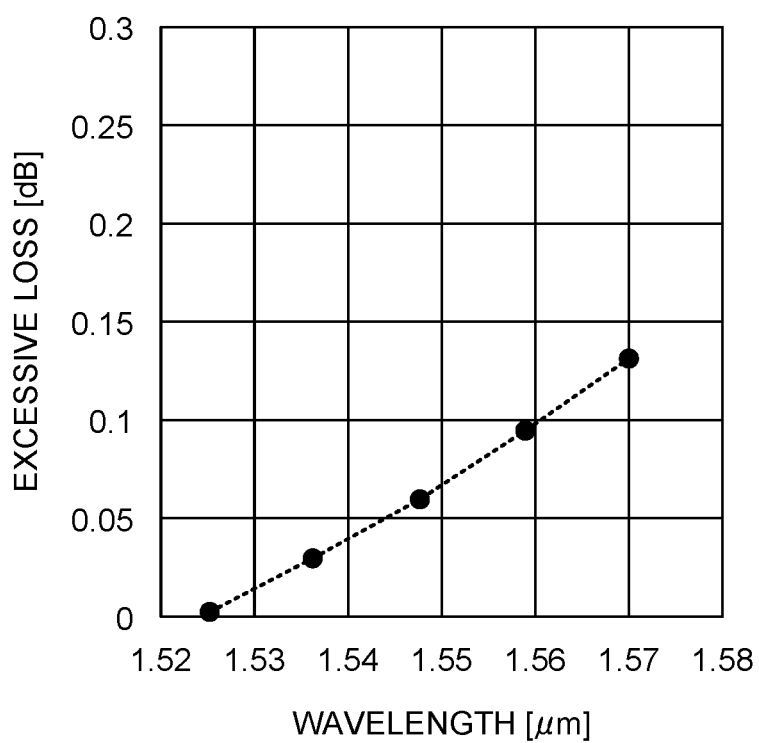
FIG. 23 is a diagram illustrating the relationship between an excessive loss and a wavelength in the tap coupler.

FIG. 18 is a block diagram illustrating an example of the optical reception device 1A according to the fourth embodiment. The optical reception device 1A illustrated in FIG. 18 includes the tap coupler 5, a variable attenuator 4A, a receiver 8, a monitor PD 6A, and the controller 7.

The tap coupler 5 receives signal light from an optical fiber and optically branches, the signal light, the first mode S and the mode M1 that is associated with the second mode M. The tap coupler 5 includes an input port 5A1 that is optically coupled to the optical fiber, the first output port 5B1 that is optically coupled to the variable attenuator 4A, and the second output port 5B2 that is optically coupled to the monitor PD 6A.

If the tap coupler 5 inputs the signal light from the input port 5A1, the tap coupler 5 generates the first mode S and the second mode M of the signal light in accordance with the discontinuous portion between the fourth optical waveguide 11 and the fifth optical waveguide 12 that are included in the first optical waveguide 10. Furthermore, the tap coupler 5 transmits and outputs the first mode S to the first output port 5B1 through the second optical waveguide 21. Furthermore, the second optical waveguide 21 transitions the second mode M to the third optical waveguide 22. The third optical waveguide 22 converts the mode M1 that is associated with the second mode M in accordance with the transition of the second mode M received from the second optical waveguide 21, and then, outputs the converted mode M1 as the branch light to the second output port 5B2.

The variable attenuator 4A performs level adjustment on the signal light that has been input from the tap coupler 5, and outputs the signal light that has been subjected to level adjustment to the receiver 8. The receiver 8 converts, from the signal light that has been subjected to level adjustment performed in the variable attenuator 4A, to electrical signal data by using local emission light that is supplied from a light source that is not illustrated, and then, outputs the converted data to the DSP.

The monitor PD 6A converts, to a monitor current value, the branch light in the mode M1 that has been branched out at the tap coupler 5. The controller 7 outputs, to the variable attenuator 4A on the basis of the monitor current value associated with the branch light passing through the monitor PD 6A, a control signal that adjusts the level of the signal light that is an output of the variable attenuator 4A. The variable attenuator 4A adjusts the level of the signal light in accordance with the control signal.

In the tap coupler 5 included in the optical reception device 1A, it is possible to ensure the tap in the wavelength range of wide band with low loss. As a result, by adjusting the level of the signal light of the variable attenuator 4A with high accuracy, in the optical reception device 1A, it is possible to suppress the degradation of the quality of the signal by stably inputting the signal light at the maximum input level.

In addition, the high-order mode separation unit 5B according to the embodiment may have any structure as long as the device having a function for extracting a piece of specific mode M1 from the second optical waveguide 21 and the third optical waveguide 22 through which two or more modes are propagated is used. For example, the high-order mode separation unit 5B is also able to be implemented by a symmetrical directional coupler in addition to the insulation converter. The directional coupler has a structure in which only further higher order mode is transitioned to the waveguide that is adjacent to the directional coupler by using a property in which the two modes have a difference in confinement of light to the core. Therefore, the directional coupler may simply maintain the same mode after the transition.

Furthermore, a case has been described as an example in which the high-order mode separation unit 5B uses the directional coupler having a symmetrical structure; however, the directional coupler having an asymmetrical structure may be used, and appropriate modifications are possible. In the directional coupler having an asymmetrical structure, a directional coupler is formed by optical waveguides each having a different core width, and separates the modes by transitioning, by changing the core width, the input mode to the different mode of another optical waveguide. Then, the directional coupler is able to convert the mode to an arbitrary mode after the transition, and is thus able to change the mode to an optimum mode.

In addition, as the high-order mode separation unit 5B, it is possible to be constituted by an insulation converter that allows the modes that transition in a waveguide to be the same. In this case, although both of the input first mode S and the input second mode M transition to an adjacent waveguide, if the order of the mode is different, the degree of leakage of the electric field to the clad 14 is different, so that it is possible to separate the modes by highly efficiently transitioning only one of the modes. Furthermore, it is possible to constitute the high-order mode separation unit 5B having an asymmetrical Y branch portion that is able to allow the first mode S and the second mode M to be separated, and appropriate modifications are possible.

A case has been described as an example in which the tap coupler 5 according to the present embodiment constitutes a rib waveguide as a waveguide structure of the core 15; however, the example is not limited to a rib waveguide, but may be used for, for example, a ridge waveguide, a rectangular waveguide, and a high mesa waveguide. Furthermore, in a rectangular waveguide, light is strongly confined, so that a loss is small even if the degree of the bent is low. As a result, it is possible to implement a bent waveguide with low loss.

A case has been described as an example in which the waveguide structure of the tap coupler 5 according to the present embodiment is a silicon optical waveguide in which the material of the core 15 is Si and the material of the clad 14 is $SiO_2$. However, the waveguide structure may be possible to apply to a planar lightwave circuit (PLC), an InP waveguide, and a GaAs waveguide in which the materials of the core 15 and the clad 14 are $SiO_2$.

Furthermore, a case has been described as an example in which the material of the upper side clad 14A is $SiO_2$, but a Si waveguide made of air, SiN, or the like may be used. In a case of the Si waveguide, a difference in light refractive index is increased, so that confinement of the light is strong and it is thus possible to implement a bent waveguide with low loss even in a case of small R, that is, it is possible to implement a reduction in size of the device.

According to an aspect of an embodiment, it is possible to provide a tap coupler that ensures a stable tap in which wavelength dependence of signal light is small.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A tap coupler comprising:
a mode generation unit that generates, in accordance with a discontinuous portion that is disposed on a travelling path of signal light that is propagating, a first mode of the signal light and a second mode that is different from the first mode;
a separation unit that separates, when the first mode and the second mode are input from the mode generation unit, the first mode and the second mode;
an output unit that outputs branch light in accordance with a transition of the second mode received from the separation unit; and
a core that is formed on a substrate,
wherein the core including
a first optical waveguide,
a second optical waveguide that is optically coupled to the first optical waveguide, and
a third optical waveguide that is disposed adjacent to the second optical waveguide,
the mode generation unit is constituted by the first optical waveguide,
the separation unit is constituted by the second optical waveguide, and
the output unit is constituted by the third optical waveguide.

2. The tap coupler according to claim 1, further including a clad that covers the core.

3. The tap coupler according to claim 2, wherein
the core is made of silicon, and
the clad is made of a material that includes $SiO_2$.

4. The tap coupler according to claim 1, wherein
the first optical waveguide includes the discontinuous portion constituted such that at least a core width of the first optical waveguide is different by aligning a central axis that is along a traveling direction of the signal light that is propagating.

5. The tap coupler according to claim 1, wherein
the first optical waveguide includes
a fourth optical waveguide, and
a fifth optical waveguide that is optically coupled to the fourth optical waveguide, and
a core width of the fourth optical waveguide constitutes the discontinuous portion by setting the core width to be different from a core width of the fifth optical waveguide.

6. The tap coupler according to claim 1, wherein the tap coupler is an insulation converter that includes the second optical waveguide and the third optical waveguide.

7. The tap coupler according to claim 1, wherein the first optical waveguide, the second optical waveguide, and the third optical waveguide are rib waveguides.

8. The tap coupler according to claim 1, further comprising:
a detector that is optically coupled to the third optical waveguide and that detects the branch light received from the third optical waveguide; and
a controller that controls, based on a detection result obtained by the detector, an attenuator that attenuates the signal light.

9. An optical communication apparatus comprising:
a processor that executes signal processing on an electrical signal;
a light source that emits light;
a communication device that performs communication using the electrical signal and the light;
a variable attenuator that performs level adjustment on signal light that is received from the communication device or signal light that is output to the communication device;
a tap coupler that obtains, from signal light that is received from the variable attenuator or signal light that is output to the variable attenuator, the signal light and branch light of the signal light;
a detector that detects the branch light received from the tap coupler; and
a controller that controls the variable attenuator based on a detection result obtained by the detector, wherein
the tap coupler includes
a mode generation unit that generates, in accordance with a discontinuous portion that is disposed on a travelling path of signal light that is propagating, a first mode of the signal light and a second mode that is different from the first mode;
a separation unit that separates, when the first mode and the second mode are input from the mode generation unit, the first mode and the second mode;
an output unit that outputs the branch light in accordance with a transition of the second mode received from the separation unit; and
a core that is formed on a substrate,
wherein the core including
a first optical waveguide,
a second optical waveguide that is optically coupled to the first optical waveguide, and
a third optical waveguide that is disposed adjacent to the second optical waveguide,
the mode generation unit is constituted by the first optical waveguide,
the separation unit is constituted by the second optical waveguide, and
the output unit is constituted by the third optical waveguide.

10. The optical communication apparatus according to claim 9, wherein
the variable attenuator performs level adjustment on the signal light that is input to the communication device, and
the tap coupler obtains the signal light and the branch light of the signal light from the signal light that is input to the variable attenuator.

11. An optical branching method that causes a tap coupler to execute a process comprising:
generating, in accordance with a discontinuous portion that is disposed on a travelling path of signal light that is propagating, a first mode of the signal light and a second mode that is different from the first mode;
separating, when the first mode and the second mode are input, the first mode and the second mode; and
outputting branch light in accordance with a transition of the separated second mode,
wherein
the generating is executed by using a first optical waveguide included in a core that is formed on a substrate,
the separating is executed by using a second optical waveguide that is included in the core and is optically coupled to the first optical waveguide, and
the outputting is executed by a third optical waveguide that is included in the core and is disposed adjacent to the second optical waveguide.

* * * * *